US012711416B2

(12) United States Patent
Montanari et al.

(10) Patent No.: US 12,711,416 B2
(45) Date of Patent: Aug. 18, 2026

(54) MODEL MODIFICATION AND DEPLOYMENT

(71) Applicant: Nokia Technologies Oy, Espoo (FI)

(72) Inventors: Alessandro Montanari, Cambridge (GB); Fahim Kawsar, Cambridge (GB); Akhil Mathur, London (GB); Chulhong Min, Trumpington (GB)

(73) Assignee: NOKIA TECHNOLOGIES OY, Espoo (FI)

( * ) Notice: Subject to any disclaimer, the term of this patent is extended or adjusted under 35 U.S.C. 154(b) by 1449 days.

(21) Appl. No.: 17/314,244

(22) Filed: May 7, 2021

(65) Prior Publication Data

US 2021/0350280 A1 Nov. 11, 2021

(30) Foreign Application Priority Data

May 7, 2020 (GB) ..................................... 2006801

(51) Int. Cl.
*G06N 20/00* (2019.01)
*G06F 18/21* (2023.01)

(52) U.S. Cl.
CPC ......... *G06N 20/00* (2019.01); *G06F 18/2178* (2023.01)

(58) Field of Classification Search
CPC ........ G06N 20/00; G06N 3/0495; G06N 3/08; G06N 3/04; G06N 3/0464; G06N 3/0475;
(Continued)

(56) References Cited

U.S. PATENT DOCUMENTS 8,225,074 B2 7/2012 Chakradhar et al.
2016/0328644 A1 11/2016 Lin et al.
(Continued)

FOREIGN PATENT DOCUMENTS

CN 107729999 A 2/2018
EP 3309719 A1 4/2018
(Continued)

OTHER PUBLICATIONS

Carbune et al., "Fast multi-language LSTM-based online handwriting recognition", arXiv, Feb. 22, 2019, pp. 1-13.
(Continued)

*Primary Examiner* — David Yi
*Assistant Examiner* — Paul Coleman
(74) *Attorney, Agent, or Firm* — ALSTON & BIRD LLP

(57) ABSTRACT

An apparatus, method and computer program is described comprising: determining an initial performance of a first model, wherein determining the initial performance comprises deploying the first model at a first device; determining one or more operations for modifying the first model based on at least the initial performance of the first model and one or more user requirements; modifying the first model by performing the one or more operations; determining whether a performance of the modified first model satisfies the one or more user requirements, wherein the determining comprises deploying the modified first model at the first device; and in the event that the modified first model does not satisfy the one or more user requirements, further modifying the first model by performing one or more further operations until the performance of the modified first model satisfies the one or more user requirements, wherein the determining further one or more operations based on at least the performance of the modified first model and the one or more user requirements.

14 Claims, 11 Drawing Sheets

(58) Field of Classification Search
CPC ... G06N 3/0499; G06F 18/2178; G06F 18/20; G06F 18/26; G06F 18/27; G06F 18/30
See application file for complete search history.

(56) References Cited

U.S. PATENT DOCUMENTS

| | | | | |
|---|---|---|---|---|
| 2018/0349103 | A1 | 12/2018 | Brown et al. | |
| 2019/0188557 | A1 * | 6/2019 | Lowell | G06N 3/063 |
| 2019/0286972 | A1 | 9/2019 | El Husseini et al. | |
| 2019/0317880 | A1 | 10/2019 | Herr et al. | |
| 2020/0034710 | A1 * | 1/2020 | Sidhu | G05D 1/81 |

FOREIGN PATENT DOCUMENTS

| | | | |
|---|---|---|---|
| EP | 3486843 | A1 | 5/2019 |
| EP | 3306535 | B1 | 12/2019 |
| WO | 2019/241921 | A1 | 12/2019 |

OTHER PUBLICATIONS

He et al., "Streaming End-to-end Speech Recognition For Mobile Devices", IEEE International Conference on Acoustics, Speech and Signal Processing (ICASSP), May 12-17, 2019, pp. 6381-6385.
Wronski et al., Handheld Multi-Frame Super-Resolution, arXiv, May 8, 2019, 24 pages.
Liba et al., "Handheld mobile photography in very low light", ACM Transactions on Graphics, vol. 38, No. 6, Nov. 2019, pp. 1-16.
"Dev Board", Coral, Mar. 8, 2020, Webpage archive available at: https://web.archive.org/web/20200308042609/https://coral.ai/products/dev-board/.
"Neural Compute Stick 2", Intel, May 13, 2020, Webpage archive available at : https://web.archive.org/web/20200513213345/https://software.intel.com/content/www/us/en/develop/hardware/neural-compute-stick.html.
"Jetson Nano Developer Kit",.Nvidia Developer, Dec. 15, 2019, Webpage archive available at : https://web.archive.org/web/20191215145845/https://developer.nvidia.com/embedded/jetson-nano-developer-kit.
"Machine Learning", Developer.Apple, Jan. 17, 2020, Webpage archive available at : https://web.archive.org/web/20200117165526/https://developer.apple.com/machine-learning/.
Lane et al., "DeepX: A Software Accelerator for Low-Power Deep Learning Inference on Mobile Devices", ACM/IEEE International Conference on Information Processing in Sensor Networks (IPSN), Apr. 11-14, 2016, 12 pages.
Georgiev et al., "DSP.Ear: leveraging co-processor support for continuous audio sensing on smartphones", Proceedings of the 12th ACM Conference on Embedded Network Sensor Systems, Nov. 2014, pp. 295-309.
Georgiev et al., "LEO: scheduling sensor inference algorithms across heterogeneous mobile processors and network resources", Proceedings of the 22nd Annual International Conference on Mobile Computing and Networking, Oct. 2016, pp. 320-333.
Liu et al., "Rethinking the Value of Network Pruning", arXiv, Oct. 11, 2018, pp. 1-13.
Xue et al., "Restructuring of Deep Neural Network Acoustic Models with Singular Value Decomposition", Interspeech, Aug. 25-29, 2013, pp. 2365-2369.
Kim et al., "Compression of Deep Convolutional Neural Networks for Fast and Low Power Mobile Applications", arXiv, Nov. 20, 2015, pp. 1-16.
Chen et al., "TVM: An Automated End-to-end Optimizing Compiler for Deep Learning", Proceedings of the 13th USENIX Symposium on Operating Systems Design and Implementation, Oct. 8-10, 2018, pp. 579-594.
Zheng et al., "Auto-tuning a Convolutional Network for Mobile GPU", TVM, 2020, 9 pages.
Werkhoven, "Kernel Tuner: A Search-optimizing GPU Code Auto-tuner", Future Generation Computer Systems, vol. 90, Jan. 2019, pp. 347-358.
Search Report received for corresponding United Kingdom Patent Application No. 2006801.1, dated Feb. 24, 2021, 13 pages.
Zhao et al., "Hardware Compilation of Deep Neural Networks: An Overview", IEEE 29th International Conference on Application-specific Systems, Architectures and Processors (ASAP), Jul. 10-12, 2018, 8 pages.
Examination Report for United Kingdom Application No. GB2006801.1 dated Aug. 23, 2024, 8 pages.
Examination Report for United Kingdom Application No. GB2006801.1 dated Oct. 31, 2024, 7 pages.
Office action received for corresponding United Kingdom Patent Application No. 2006801.1, dated Oct. 27, 2022, 6 pages.
Office action received for corresponding United Kingdom Patent Application No. 2006801.1, dated Apr. 28, 2023, 8 pages.
Office action received for corresponding United Kingdom Patent Application No. 2006801.1, dated Jun. 29, 2022, 5 pages.
Office action received for corresponding United Kingdom Patent Application No. 2006801.1, dated Oct. 4, 2023, 6 pages.
"AI on Raspberry Pi With the Intel Neural Compute Stick", Hackaday, Retrieved on Nov. 30, 2023, Webpage available at : https://hackaday.com/2019/01/31/ai-on-raspberry-pi-with-the-intel-neural-compute-stick/.
Castro-Zunti et al., "License plate segmentation and recognition system using deep learning and OpenVINO", IET Intelligent Transport Systems, vol. 14, No. 2, 2020, pp. 119-126.
Office action received for corresponding United Kingdom Patent Application No. 2006801.1, dated Feb. 13, 2024, 6 pages.
Demidovskij et al., "OpenVINO Deep Learning Workbench: Comprehensive Analysis and Tuning of Neural Networks Inference", Proceedings of the IEEE/CVF International Conference on Computer Vision (ICCV), Oct. 27-28, 2019, 5 pages.
Antonini et al., "Resource Characterisation of Personal-Scale Sensing Models on Edge Accelerators", Proceedings of the First International Workshop on Challenges in Artificial Intelligence and Machine Learning for Internet of Things, Nov. 10-13, 2019, pp. 49-55.

* cited by examiner

MODEL MODIFICATION AND DEPLOYMENT

FIELD

The present specification relates to modification (e.g. optimization) of models, such as machine learning models.

BACKGROUND

Manual tuning for models, such as machine learning models, is known. There remains a need for further improvements related to deployment of such models at different devices.

SUMMARY

In a first aspect, this specification describes an apparatus comprising means for performing: determining an initial performance of a first model, wherein determining the initial performance comprises deploying the first model at a first device; determining one or more operations for modifying the first model based on at least the initial performance of the first model and one or more user requirements; modifying the first model by performing the one or more operations; determining whether a performance of the modified first model satisfies the one or more user requirements, wherein the determining comprises deploying the modified first model at the first device; and in the event that the modified first model does not satisfy the one or more user requirements, further modifying the first model by performing one or more further operations until the performance of the modified first model satisfies the one or more user requirements, wherein the determining further one or more operations based on at least the performance of the modified first model and the one or more user requirements.

The means for determining whether the performance of the modified first model satisfies the one or more user requirements may further comprise means for performing: running a first number of inferences of the deployed first model at the first device; collecting performance values of the modified first model; and comparing the performance values with the one or more user requirements.

The one or more user requirements may comprise one or more of accuracy requirements, latency requirements, memory consumption requirements, and/or energy consumption requirements.

Some embodiment comprise means for performing: retraining the modified first model.

The one or more operations for modifying the first model may comprise operations for optimising one or more of accuracy, latency, memory consumption, and/or energy consumption of the first model based on the one or more user requirements.

The one or more operations for modifying the first model may comprise one or more of: quantisation of the first model; modification of a size of the first model; causing concurrent execution of a plurality of models, including the first model, to optimize use of memory at the first device; and/or replacing one or more first actions comprised in the execution of the first model at the first device with one or more equivalent second actions, wherein the one or more first actions are unsupported by the first device, and the one or more second actions are supported by the first device.

Deploying the modified first model at the first device further may comprise means for performing: receiving, from the first device, requirements of the first device, wherein the requirements are based at least in part on hardware of the first device; determining a compilation flow for deployment of the modified first model in the first device based, at least in part, on the received requirements; generating a compiled first model binary based, at least in part, on the compilation flow; and deploying the compiled first model binary at the first device.

Generating the compiled first model binary may further comprise performing, depending on the determined compilation flow, one of a pre-training quantization and post training quantization. Alternatively, or in addition, generating the compiled first model binary may further comprise performing, depending on the determined compilation flow, performing one or more format conversion actions. The said compilation flow may be determined based at least in part on an accelerator of the first device.

In some embodiments, at least some of said means are remote from the first device.

In a second aspect, this specification describes an apparatus comprising means for performing: receiving, from a first device, requirements of the first device, wherein the requirements are based at least in part on hardware of the first device; receiving a first model for execution using the first device; determining a compilation flow for deployment of the first model using the first device based, at least in part, on the received requirements; generating a compiled first model binary based, at least in part, on the compilation flow; and deploying the compiled first model binary at the first device.

Generating the compiled first model binary may further comprise performing, depending on the determined compilation flow, one of a pre-training quantization and post training quantization. Alternatively, or in addition, generating the compiled first model binary may further comprise performing, depending on the determined compilation flow, performing one or more format conversion actions. The said compilation flow may be determined based at least in part on an accelerator of the first device.

In some embodiments, at least some of said means are remote from the first device.

In the first or the second aspect, the said means may comprise: at least one processor; and at least one memory including computer program code, the at least one memory and the computer program configured, with the at least one processor, to cause the performance of the apparatus.

In a third aspect, this specification describes a method comprising: determining an initial performance of a first model, wherein determining the initial performance comprises deploying the first model at a first device; determining one or more operations for modifying the first model based on at least the initial performance of the first model and one or more user requirements; modifying the first model by performing the one or more operations; determining whether a performance of the modified first model satisfies the one or more user requirements, wherein the determining comprises deploying the modified first model at the first device; and in the event that the modified first model does not satisfy the one or more user requirements, further modifying the first model by performing one or more further operations until the performance of the modified first model satisfies the one or more user requirements, wherein the determining further one or more operations based on at least the performance of the modified first model and the one or more user requirements.

Determining whether the performance of the modified first model satisfies the one or more user requirements may further comprise: running a first number of inferences of the deployed first model at the first device; collecting performance values of the modified first model; and comparing the performance values with the one or more user requirements.

The one or more user requirements may comprise one or more of accuracy requirements, latency requirements, memory consumption requirements, and/or energy consumption requirements.

Some embodiments further comprise retraining the modified first model.

The one or more operations for modifying the first model may comprise operations for optimising one or more of accuracy, latency, memory consumption, and/or energy consumption of the first model based on the one or more user requirements.

The one or more operations for modifying the first model may comprise one or more of: quantisation of the first model; modification of a size of the first model; causing concurrent execution of a plurality of models, including the first model, to optimize use of memory at the first device; and/or replacing one or more first actions comprised in the execution of the first model at the first device with one or more equivalent second actions, wherein the one or more first actions are unsupported by the first device, and the one or more second actions are supported by the first device.

Deploying the modified first model at the first device further may comprise: receiving, from the first device, requirements of the first device, wherein the requirements are based at least in part on hardware of the first device; determining a compilation flow for deployment of the modified first model in the first device based, at least in part, on the received requirements; generating a compiled first model binary based, at least in part, on the compilation flow; and deploying the compiled first model binary at the first device.

Generating the compiled first model binary may further comprise performing, depending on the determined compilation flow, one of a pre-training quantization and post training quantization. Alternatively, or in addition, generating the compiled first model binary may further comprise performing, depending on the determined compilation flow, performing one or more format conversion actions. The said compilation flow may be determined based at least in part on an accelerator of the first device.

In some embodiments, at least some of said means are remote from the first device.

In a fourth aspect, this specification describes a method comprising: receiving, from a first device, requirements of the first device, wherein the requirements are based at least in part on hardware of the first device; receiving a first model for execution using the first device; determining a compilation flow for deployment of the first model using the first device based, at least in part, on the received requirements; generating a compiled first model binary based, at least in part, on the compilation flow; and deploying the compiled first model binary at the first device.

Generating the compiled first model binary may further comprise performing, depending on the determined compilation flow, one of a pre-training quantization and post training quantization. Alternatively, or in addition, generating the compiled first model binary may further comprise performing, depending on the determined compilation flow, performing one or more format conversion actions. The said compilation flow may be determined based at least in part on an accelerator of the first device.

In some embodiments, at least some of said means are remote from the first device.

In a fifth aspect, this specification describes an apparatus configured to perform (at least) any method as described with reference to the third or fourth aspects.

In a sixth aspect, this specification describes computer-readable instructions which, when executed by computing apparatus, cause the computing apparatus to perform (at least) any method as described with reference to the third or fourth aspects.

In a seventh aspect, this specification describes a computer program comprising instructions for causing an apparatus to perform at least the following:

In an eighth aspect, this specification describes a computer-readable medium (such as a non-transitory computer-readable medium) comprising program instructions stored thereon for performing (at least) the method of the third or fourth aspects.

In a ninth aspect, this specification describes an apparatus comprising: at least one processor; and at least one memory including computer program code which, when executed by the at least one processor, causes the apparatus to perform (at least) the method of the third or fourth aspects.

In a tenth aspect, this specification describes an apparatus comprising: means (such as a control module) for determining an initial performance of a first model, wherein determining the initial performance comprises deploying the first model at a first device; means (such as the control module) for determining one or more operations for modifying the first model based on at least the initial performance of the first model and one or more user requirements; means (such as a tuner) for modifying the first model by performing the one or more operations; means (such as the control module) for determining whether a performance of the modified first model satisfies the one or more user requirements, wherein the determining comprises deploying the modified first model at the first device; and in the event that the modified first model does not satisfy the one or more user requirements, means (such as the tuner) for further modifying the first model by performing one or more further operations until the performance of the modified first model satisfies the one or more user requirements, wherein the determining further one or more operations based on at least the performance of the modified first model and the one or more user requirements.

In an eleventh aspect, this specification describes an apparatus comprising: means (such as a first input of a compiler) for receiving, from a first device (such as a resource discoverer), requirements of the first device, wherein the requirements are based at least in part on hardware of the first device; means (such as a second input of the compiler) for receiving a first model for execution using the first device; means (such as the compiler) for determining a compilation flow for deployment of the first model using the first device based, at least in part, on the received requirements; means (such as the compiler) for generating a compiled first model binary based, at least in part, on the compilation flow; and means (such as an output of the compiler) for deploying the compiled first model binary at the first device.

BRIEF DESCRIPTION OF THE DRAWINGS

Example embodiments will now be described, by way of non-limiting examples, with reference to the following schematic drawings, in which.

DETAILED DESCRIPTION

Figure 1:
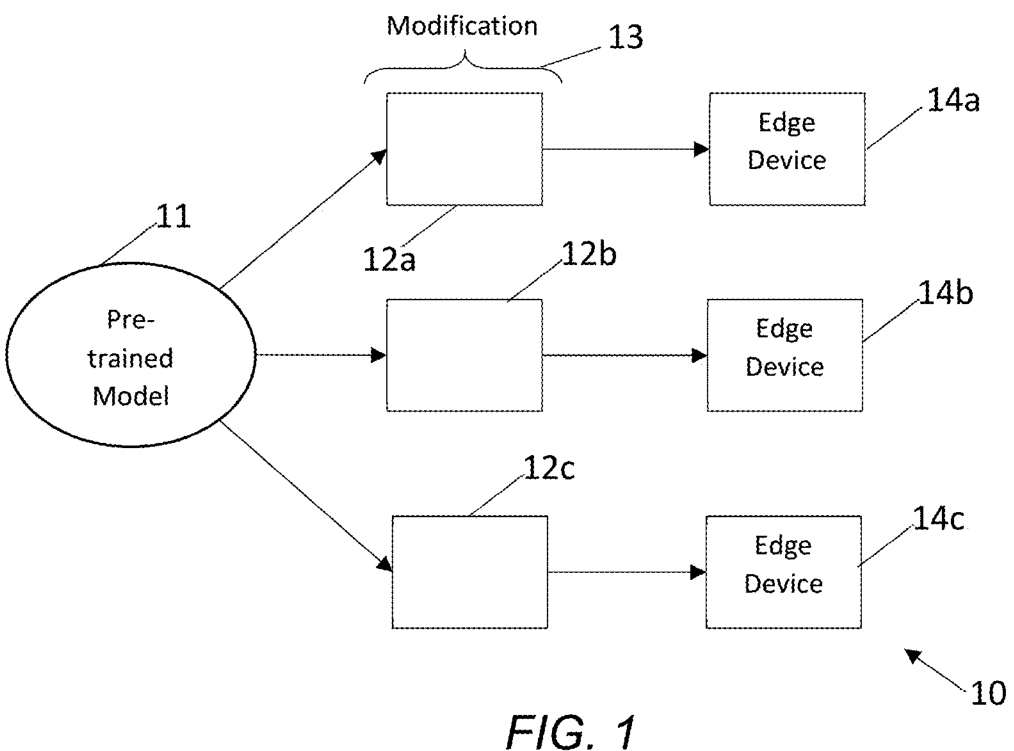
FIG. 1 is a block diagram of an example system.

The scope of protection sought for various embodiments of the invention is set out by the independent claims. The embodiments and features, if any, described in the specification that do not fall under the scope of the independent claims are to be interpreted as examples useful for understanding various embodiments of the invention.

In the description and drawings, like reference numerals refer to like elements throughout.

FIG. 1 is a block diagram of an example system, indicated generally by the reference numeral 10. The example system 10 shows a pre-trained model 11 being deployed at a plurality of edge devices 14*a*, 14*b*, and 14*c*. In order to be deployed at each of the edge devices 14, the pre-trained model 11 may need to undergo manual modification 13 in order to be optimized according, for example, to the hardware capabilities of a specific edge device. For example, the pre-trained model 11 may be modified differently at modification steps 12*a*, 12*b*, and 12*c*, in order to be compatible with the hardware requirements of the edge devices 14*a*, 14*b*, and 14*c* respectively.

Machine learning models (e.g. deep learning models, neural networks etc.) may be designed for a variety of sensing tasks, including speech, vision and motion sensing. These models may be trained on GPU servers to benefit from the computational capabilities and parallelization power of such servers. However, once developed, it may be a lengthy and manual process to deploy these models on edge devices and accelerators as different edge devices (e.g. smartphones, smartwatches, laptops etc.) and accelerators may have different hardware architecture and resource constraints than the servers on which the model was trained. Therefore, the model may need to be manually tuned based on profiling each edge accelerator for its hardware and computational capabilities, such that the manually tuned model may work on that specific edge accelerator. Such manual tuning can be time-consuming and can be difficult and expensive to implement.

Example embodiments described herein seek to provide solutions for allowing models to operate (e.g. using suitable compilation and tuning) on any available accelerator (e.g. without a lengthy manual optimization process).

Figure 2:
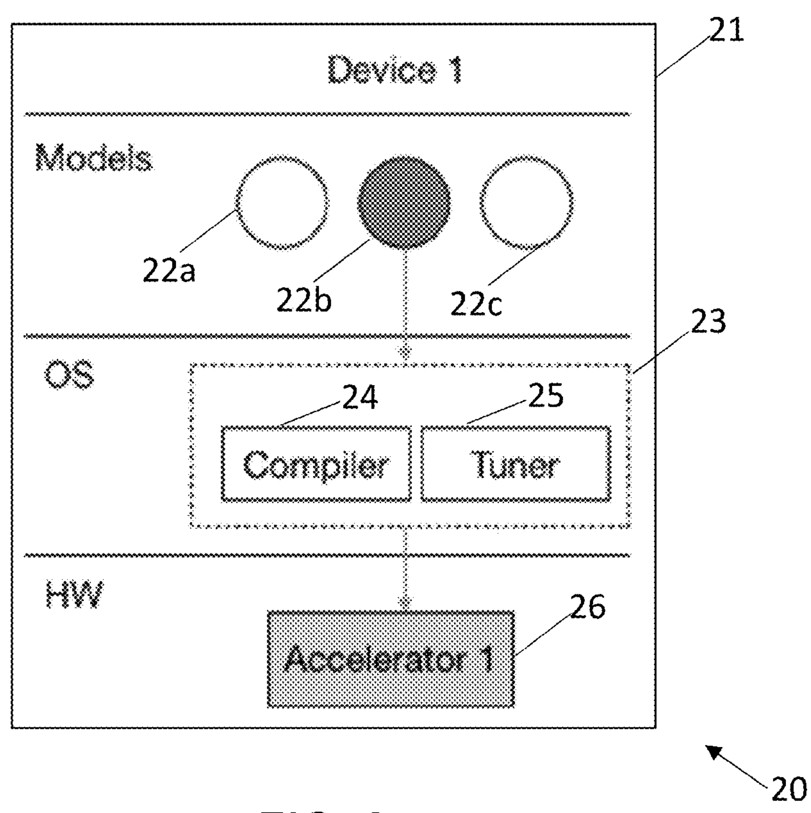
FIG. 2 is a block diagram of a system in accordance with an example embodiment.

FIG. 2 is a block diagram of a system, indicated generally by the reference numeral 20, in accordance with an example embodiment. The system 20 comprises a device 21 comprising an operating system 23 and an accelerator module 26 (e.g. comprised within the hardware of the device 21). One or more of a plurality of models 22*a*, 22*b* or 22*c* may be provided to the device 21 for deployment at the device 21. For example, as shown in FIG. 2, the model 22*b* may be deployed at the device 21. The operating system 23 may comprise a compiler module 24 and a tuner module 25. The compiler module 24 may be used for converting and/or compiling the model 22 (e.g. the model 22*b* in the example shown) to allow execution of the model using the accelerator module 26, and the tuner module 25 may be used for tuning or optimising the model 22*b*, for example to seek to provide optimal execution. In some examples, some of the components of device 21 (e.g. the compiler module 24 or the tuner module 25) may be implemented remotely.

Different devices (e.g., smartphones, smartwatches, laptops) may comprise different edge accelerators (e.g. Google Edge TPU, Intel Neural Compute Stick, Apple Neural Engine). As such, the tuning and/or compilation of the model 22*b* may be dependent on the accelerator module 26 being used. The compiler module 24 and the tuner module 25 described herein may enable any pre-trained model (such as model 22*b*) to be deployed in any device. Thus, a developer may be able to develop models without needing to know the details of all the hardware accelerators available or that may be available in the future.

Figure 3:
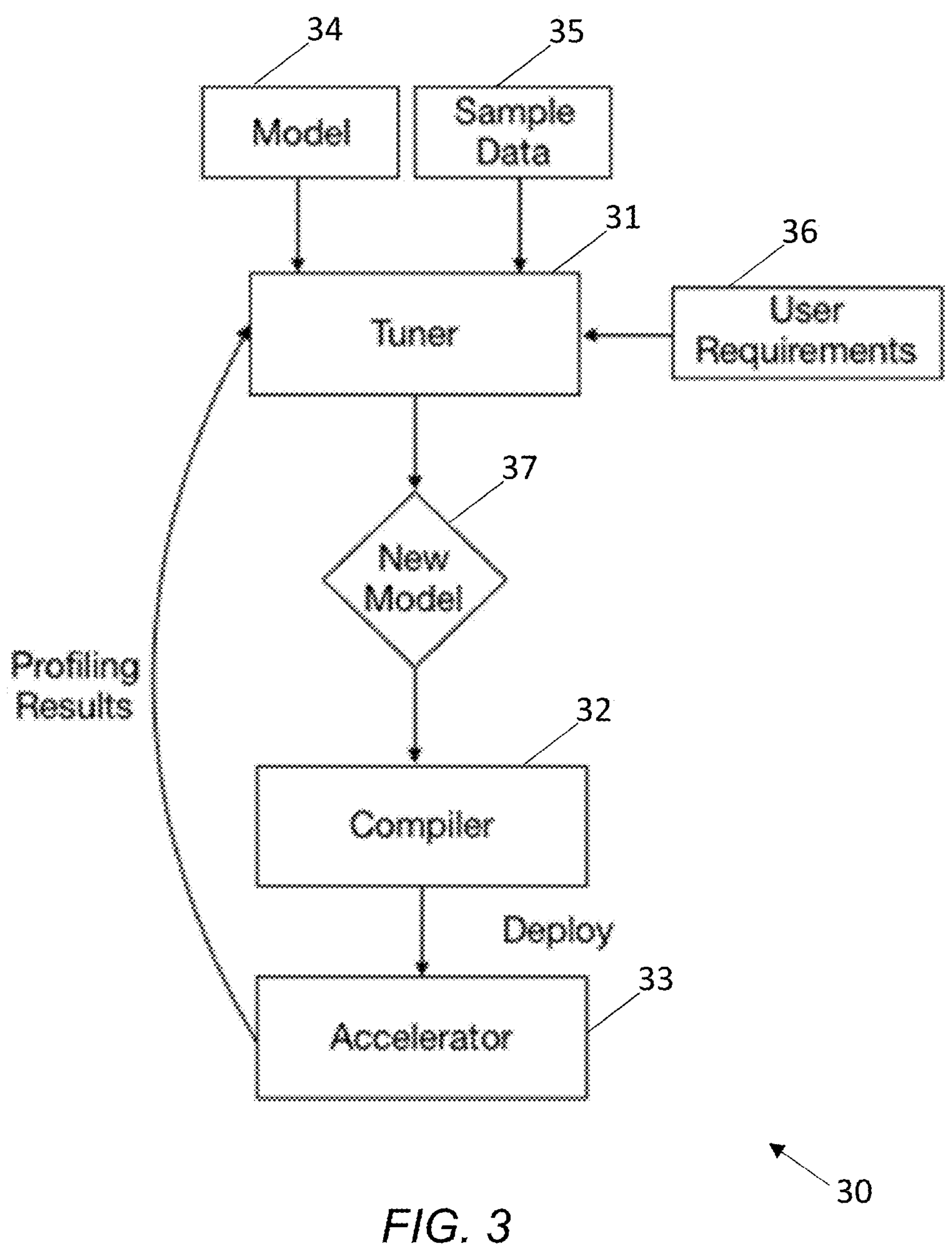
FIG. 3 is a block diagram of a system in accordance with an example embodiment.

FIG. 3 is a block diagram of a system, indicated generally by the reference numeral 30, in accordance with an example embodiment. The system 30 comprises a tuner module 31 (similar to the tuner module 25), a compiler module 32 (similar to the compiler module 24), and an accelerator module 33 (similar to the accelerator module 26). The tuner module 31 may be used for modifying (e.g. tuning or optimising) a model for running the model at the accelerator module 33. The tuner module 31 may receive as inputs a model 34 (that may be modified/optimized) and user requirements 36 (e.g. inference accuracy, execution latency, host memory consumption, and/or energy consumption). The tuner module 31 may optionally receive as an input a sample dataset 35 (which sample data set may, for example, be used when quantisation is required, as explained in further detail below).

The model 34 may be pre-trained with the sample dataset 35. The tuner module 31 may output a new model 37 (e.g. a modified model) based on the model 34 and the user requirements 36. As such, the tuner module 31 may modify the model 34 such that the user requirements 36 are satisfied. The new model 37 may be provided to the compiler module 32 and deployed at the accelerator module 33 for profiling. For example, the deployment at the accelerator module 33 may provide profiling results. Such profiling results may include information relating to the latency, accuracy, energy consumption, or memory consumption when the new model 37 is deployed and run at the accelerator module 33. The profiling results may be provided to the tuner module 31, such that the tuner module may determine whether the user requirements 36 are satisfied, and may further modify the model if required. As such, the tuner module 31 may iteratively test different compilation and deployment configurations in order to find a suitable configuration e.g. an optimal configuration) according to user requirements. In one example, the tuner module 31 is run in time periods where the device is not in use to avoid the degradation of the user experience.

Figure 4:
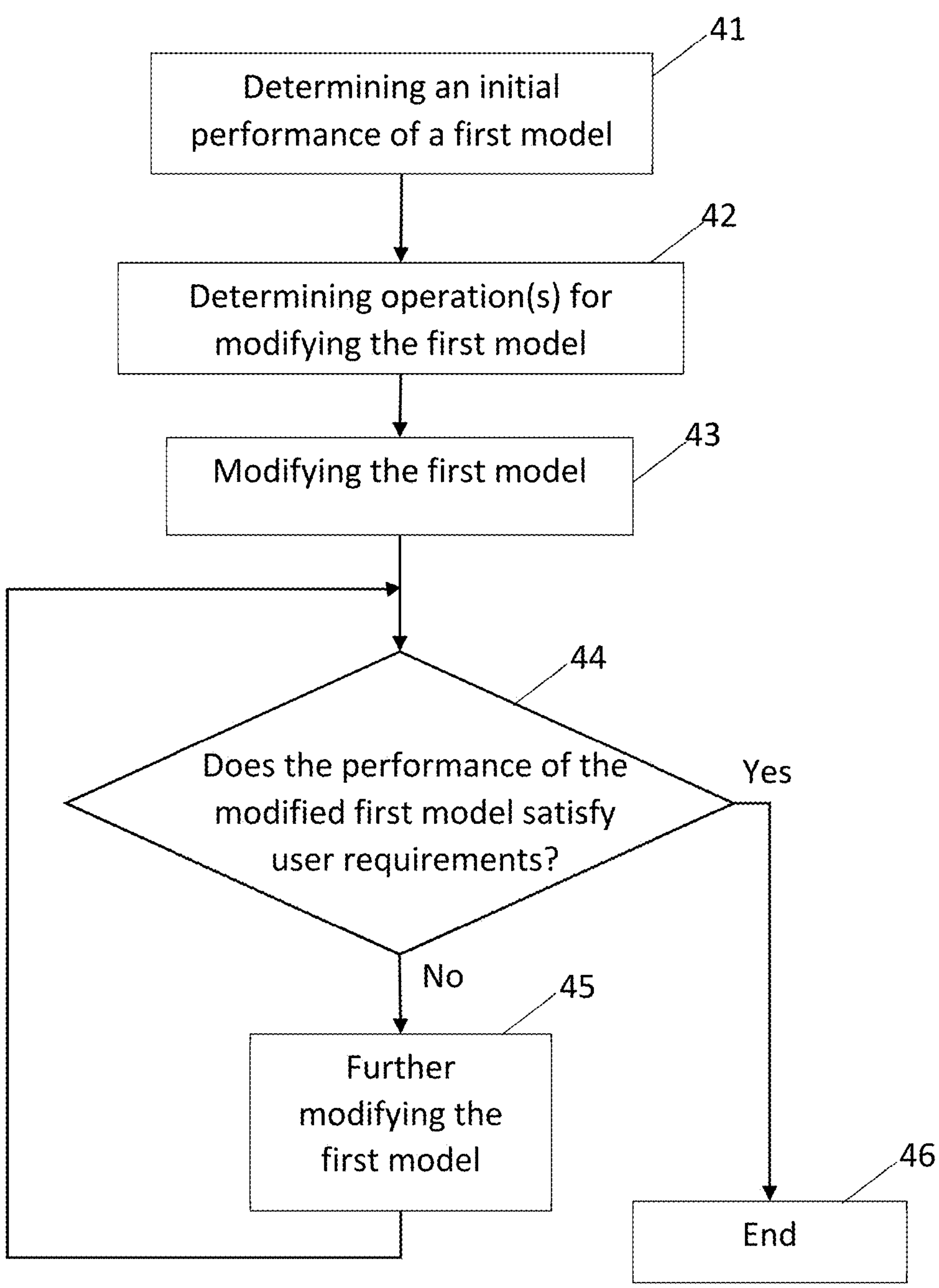
FIGS. 4 to 6 are flow charts showing algorithms in accordance with example embodiments.

FIG. 4 is a flowchart of an algorithm, indicated generally by the reference numeral 40, in accordance with an example embodiment. The operations of algorithm 40 may be performed by a tuner module, such as tuner modules 25 or 31 described above.

The algorithm 40 starts with operation 41, where an initial performance of a first model (e.g. a machine learning model)

is determined. Determining the initial performance may comprise deploying the first model at a first device. For example, the initial performance (e.g. inference accuracy, execution latency, host memory consumption, and/or energy consumption etc.) may indicate performance of the first model when run at the first device. The first model may be pre-trained with a sample dataset, as described above.

Next, at operation 42, one or more operations may be determined for modifying the first model based, for example, on at least the initial performance of the first model and one or more user requirements. The one or more operations may be used for iteratively modifying the first model to enable the performance of the first model to satisfy the user requirements. In one example, the one or more user requirements may comprise one or more of accuracy requirements, latency requirements, memory consumption requirements, and/or energy consumption requirements. In one example, the one or more operations for modifying the first model may comprise operations for optimising one or more of accuracy, latency, memory consumption, and/or energy consumption of the first model based on the one or more user requirements.

At operation 43, the first model may be modified by performing at least some of the determined one or more operations.

The algorithm 40 then moves to operation 44 for determining whether a performance of the modified first model satisfies the one or more user requirements. The determining may comprise deploying the modified first model at the first device. For example, with reference to FIG. 3, the modified first model (e.g. the new model 37) may be deployed at the first device (e.g. at the accelerator module 33 comprised within the first device) for generating profiling results, and thus determining whether the performance of the modified first model satisfies the one or more user requirements.

In the event that the modified first model does not satisfy the one or more user requirements, the first model is further modified at operation 45, for example, by performing one or more further operations until the performance of the modified first model satisfies the one or more user requirements. For example, the operation 45 may be performed iteratively until the one or more user requirements are satisfied. One or more operations for further modifying the first model at operation 45 may be determined (similar to operation 42) based on at least the performance of the modified first model and the one or more user requirements.

If it is determined at operation 44 that the performance of the modified first model satisfies the user requirements, the algorithm 40 (e.g. the tuning algorithm) may end at operation 46. The modified first model may then be compiled and deployed at the first device (e.g. at a compiler module similar to the compiler module 24 or 32, described in further detail below).

In an example embodiment, the one or more operations for modifying the first model comprise one or more of: quantisation of the first model; modification of a size of the first model; causing concurrent execution of a plurality of models, including the first model, to optimize use of memory at the first device. The one or more operations may also comprise replacing one or more first actions comprised in the execution of the first model at the first device with one or more equivalent second actions, where the one or more first actions are unsupported by the first device, and the one or more second actions are supported by the first device.

In an example embodiment, the quantisation may be an 8-bit or 16-bit quantization, for example, based on the hardware of the first device.

In an example embodiment, the modification of the size of the first model may be performed by re-engineering the model to ensure that all its parameters fit on an on-board memory of the first device or the accelerator of the first device. For example, execution latency for executing the first model at the first device may significantly be affected by the portion of the model that is executed on the accelerator and the one that runs on a host CPU. Since the accelerator's memory may be limited (e.g. 8 MB for the Google Coral), some models might not fit entirely on the memory. As such, the model may be re-engineered in the one or more operations (e.g. using techniques such as weights pruning, SVD, and/or Tucker decomposition).

In an example embodiment, the concurrent execution of a plurality of models, including the first model, may be performed to optimize use of memory at the first device. For example, the device memory used by models may be allocated by a compiler (e.g. may not be dynamically allocated). As such, when running a plurality of models, the plurality of models may be compiled in a way that maximizes the use of the on-board memory, thus obtaining the lowest compilation latency.

In an example embodiment, replacing one or more first actions comprised in the execution of the first model at the first device with one or more equivalent second actions may be performed in case the one or more first actions are unsupported by the first device, and the one or more second actions are supported by the first device. For example, accelerators may support a limited set of operations (e.g., convolution, fully connected, relu, etc.). When an unsupported layer is encountered, delegating the execution to the host CPU may significantly slow down the inference. In order to avoid the slowing down, the tuner module may identify unsupported operations and attempt to modify the model by replacing the unsupported operations with equivalent (or approximate) operations which are supported by the accelerator. Since this might result in multiple operations being used to replace a single layer in the initial (unmodified) model, the tuner module may need to evaluate the modified model to make sure it runs faster than initial model.

Figure 5:
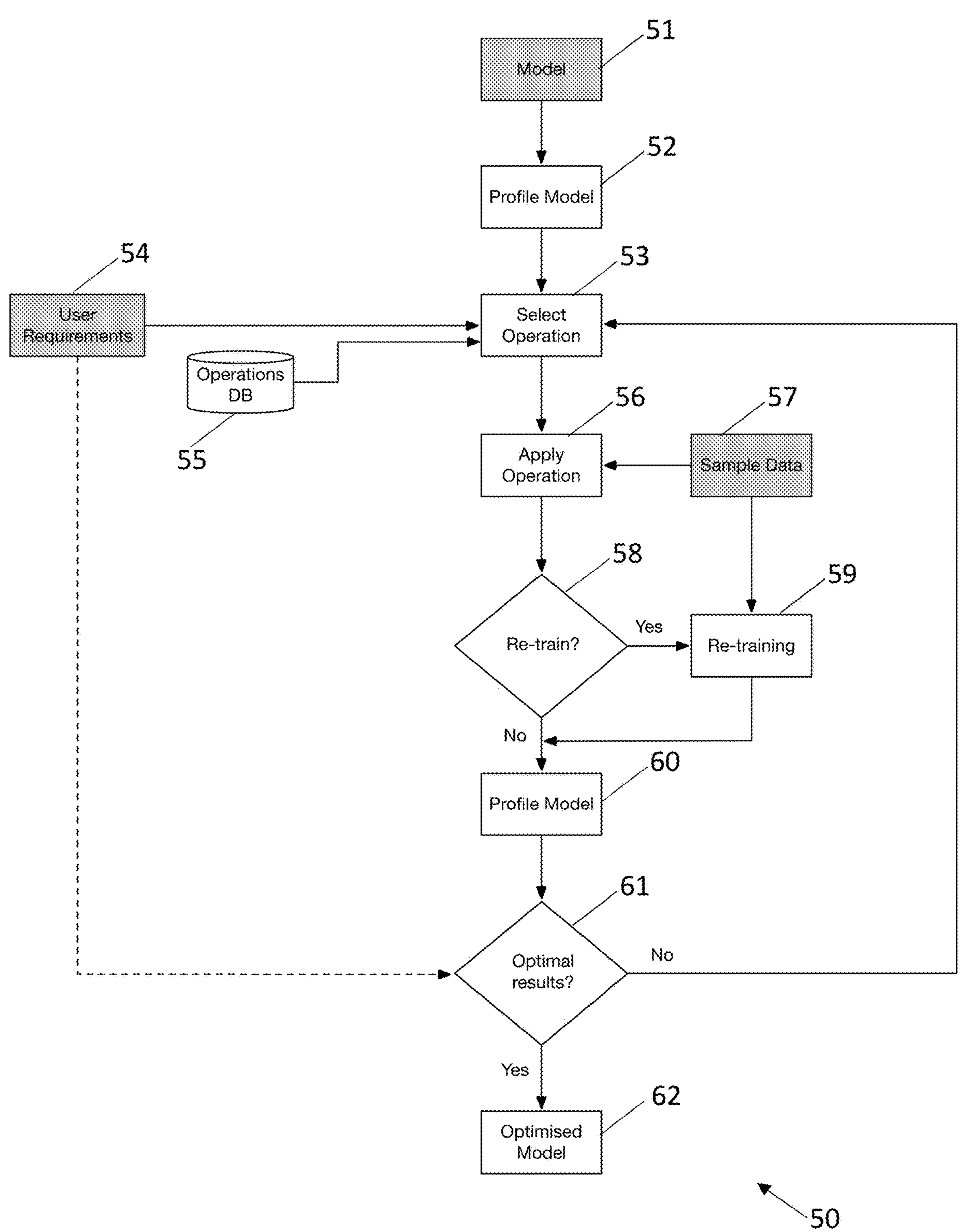

FIG. 5 is a flowchart of an algorithm, indicated generally by the reference numeral 50, in accordance with an example embodiment. The operations of algorithm 50 may be performed by a tuner module, such as tuner modules 25 or 31 described above.

The algorithm 50 shows inputs to a tuner module, the inputs comprising the model 51 (e.g. first model), user requirements 54 (e.g. provided by a user), and sample data 57.

The algorithm 50 starts at operation 52, where the model may be profiled, for example, by deploying the model on an accelerator (such as the accelerator module 33). The profiling may comprise running a fixed number of inferences and collecting average values about accuracy, latency, memory and energy consumption. The profiling at operation 52 may be used for determining (e.g. operation 41) the initial performance (e.g. baseline performance) of the first model which is then used to compare with the modified (e.g. optimised) models produced subsequently.

Next, at operation 53, one or more operations are selected for modifying the first model, for example, based on user requirements 54 and performance of the model. For example, the user requirements (e.g. minimise latency, maximise accuracy, etc.) may be used and heuristics may be applied to select an operation from the operations database 55. For example, if the user prefers to save memory, an operation may be selected for quantisation and Singular Value Decomposition, even though these may not be very likely to reduce latency. Alternatively, if the user wants to reduce latency, an operation may be selected for the Tucker decomposition.

At operation 56, the selected one or more operations may be applied to the first model to produce a modified first model. Producing the modified first model may use the sample data 57 as inputs for optionally retraining the modified first model.

At operation 58, it is determined whether the modified first model needs to be retrained. If yes, the modified first model is retrained at operation 59, for example, using the sample data 57. The modified first model may might need to be re-trained in order to recover the accuracy that might be lost during the modification.

At operation 60, the modified first model is profiled, for example, for determining the performance of the modified first model. Similar to the operation 52, the profiling in the operation 60 may comprise running a fixed number of inferences and collecting average values about accuracy, latency, memory and/or energy consumption.

At operation 61, it is determined whether the profiling results (obtained in the operation 60) are optimal results based on the user requirements 54 and the performance of the modified first model, and optionally the initial performance of the first model.

If the optimal results are not achieved (e.g. the user requirements are not satisfied), the algorithm returns to operation 53 for performing one or more further operations such that the user requirements are satisfied.

If the optimal results are achieved, the modified first model is determined to be an optimized model at operation 62, and may be compiled and deployed at the accelerator (Note: the compilation and deployment of the optimized model may have already been performed as part of the profiling operation 60.)

Figure 6:
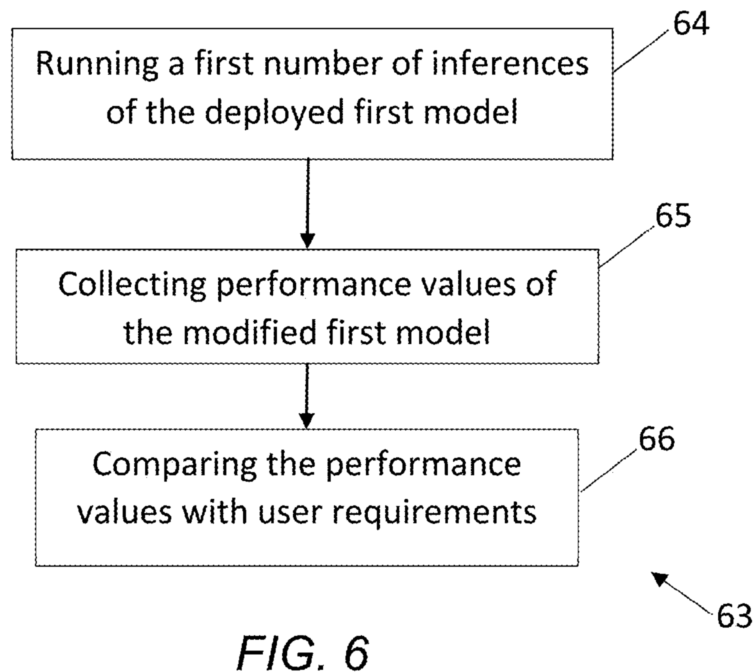

FIG. 6 is a flowchart of an algorithm, indicated generally by the reference numeral 63, in accordance with an example embodiment. The algorithm 63 may comprise operations for determining whether the performance of the modified first model satisfies the one or more user requirements, and these operations may be performed at a tuner module, such as the tuner modules 25 and/or 31 described above.

The algorithm 63 starts at operation 64 performed by running a first number of inferences of the deployed first model at the first device. Next, at operation 65, performance values of the modified first model may be collected. At operation 66, the performance values may be compared with the one or more user requirements in order to determine whether the performance of the modified first model satisfies the one or more user requirements.

Figure 7:
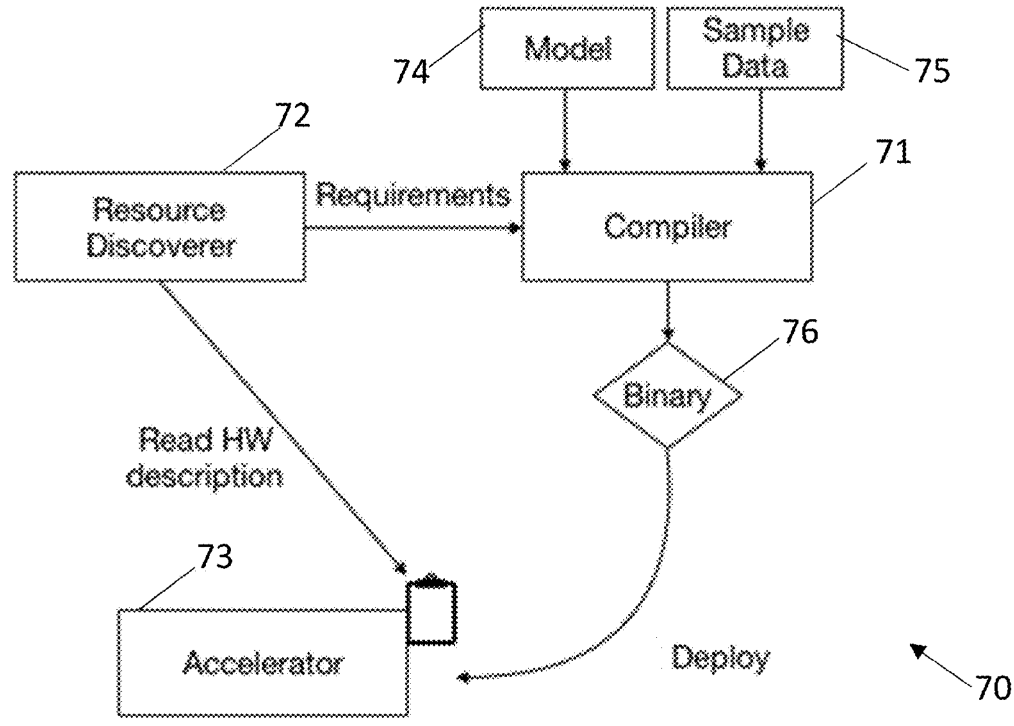
FIG. 7 is a block diagram of a system in accordance with an example embodiment.

FIG. 7 is a block diagram of a system, indicated generally by the reference numeral 70, in accordance with an example embodiment. System 70 comprises a compiler module 71, a resource discoverer module 72, and an accelerator module 73. The compiler module 71 may be used for generating a compilation flow for a model 74 to be used at a first device, for example by being deployed at the accelerator module 73. The resource discoverer module 72 may read low-level hardware description data of the first device. The hardware description data may define basic requirements (e.g., bit depth, supported operations, etc.) for a current accelerator, for example the accelerator module 73. The requirements of the first device may then be provided to the compiler module 71. The compiler module 71 may receive as inputs the model 74 and a sample dataset 75. The sample dataset 75 may optionally be used for retraining the model after compilation. The compiler module 71 may determine an optimal compilation flow and output a compiled model binary 76 based on the received requirements and the model 74.

In one example embodiment, the compilation may be performed at runtime, for example the first time the model is used at the first device. The compiled model binary 76 may be stored (e.g. cached) locally at the first device to speed up subsequent executions of the model 74.

In one example embodiment, an appropriate compilation workflow for the model 74 on a given accelerator 73 is determined based on the compiled model binary 76. The first device may then automatically and transparently spawn the necessary components to perform the workflow operations for the model 74. For instance, if a certain model is required to be re-trained in a quantization-aware manner, the compiled model binary 76 may indicate that. For retraining the model, a virtual environment (e.g., a Docker instance) may be created, the model architecture may be copied onto the virtual environment, and training data (e.g. sample data 75) may be used for retraining the model.

Figure 8:
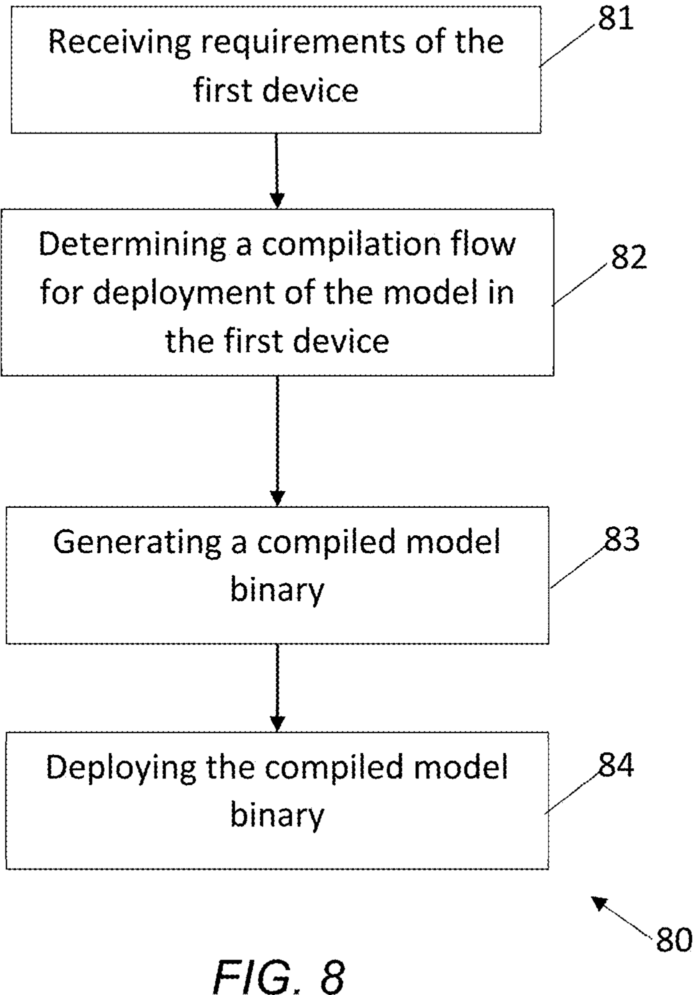
FIGS. 8 and 9 are flow charts showing algorithms in accordance with example embodiments.

FIG. 8 is a flowchart of an algorithm, indicated generally by the reference numeral 80, in accordance with an example embodiment. The operations of algorithm 80 may be performed by a compiler module, such as compiler modules 24 or 71 described above. As such, the operations of the algorithm 80 may be used for compiling a first model (e.g. model 34 or 74) at the first device. Alternatively, or in addition, the operations of the algorithm may be used for compiling a modified first model (e.g. new model 37 or optimized model 62) generated by a tuner module (e.g. tuner module 25 or 31).

The algorithm 80 starts at operation 81, where the requirements of the first device are received, wherein the requirements are based at least in part on hardware of the first device. The requirements may comprise hardware requirements (e.g., bit depth, supported operations, etc.) of an accelerator (e.g. accelerator 73) of the first device, for example, received from the resource discoverer module 72 described above.

Next, at operation 82, a compilation flow is determined for deployment of a model (e.g. the first model or the modified first model) in the first device. The compilation flow may be determined based, at least in part, on the requirements received in the operation 81.

At operation 83, a compiled model binary may be generated based, at least in part, on the compilation flow determined in the operation 82.

At operation 84, the compiled model binary may be deployed at the first device, for example, at the accelerator of the first device.

Figure 9:
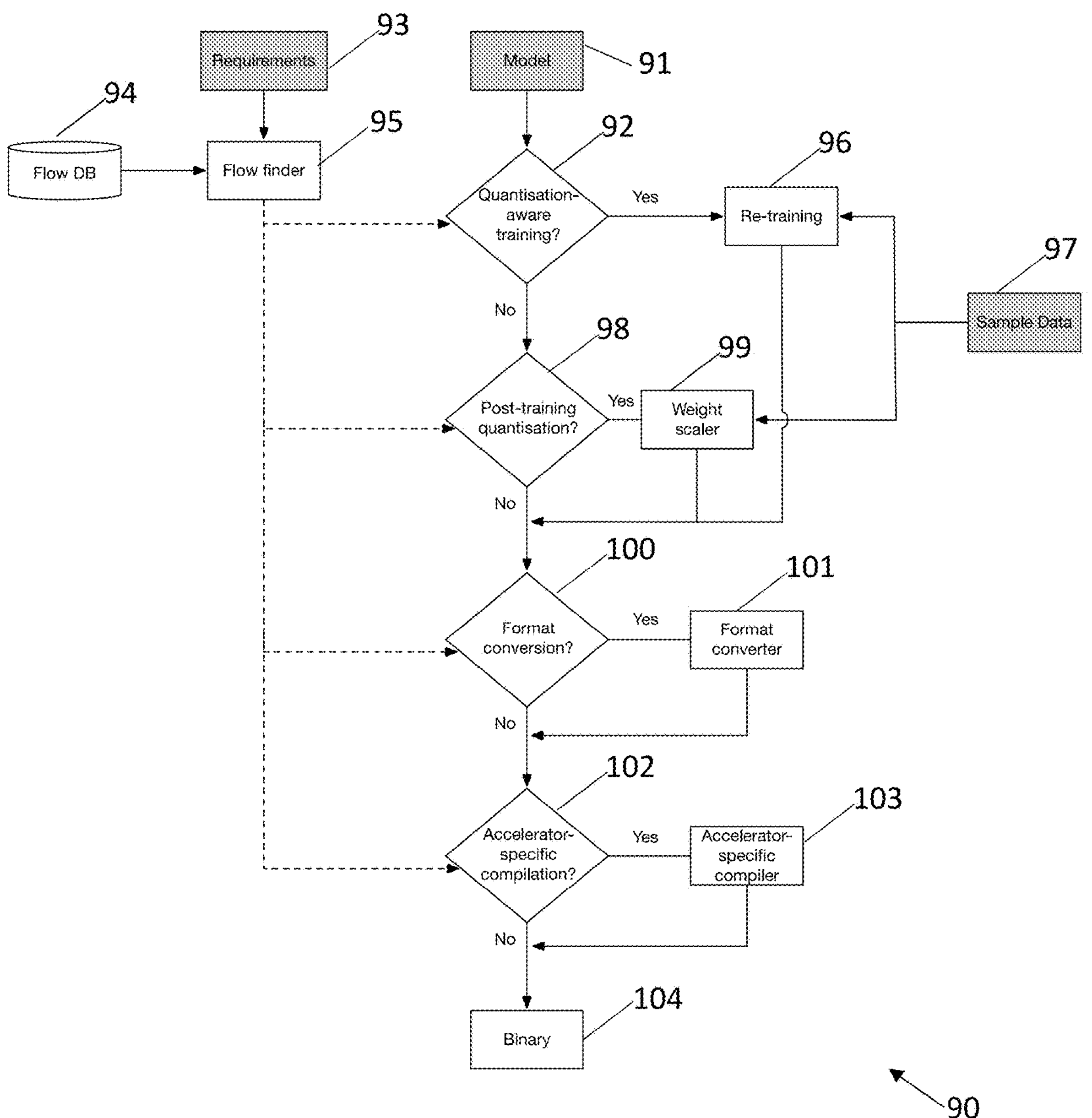

FIG. 9 is a flowchart of an algorithm, indicated generally by the reference numeral 90, in accordance with an example embodiment. One or more of the operations of algorithm 90 may be performed at a compiler module (e.g. compiler module 34 or 74 described above) as part of the operation for generating the compiled model binary described above.

The compiler module may receive as inputs a model 91, a sample dataset 97, and the requirements 93 (e.g. hardware requirements).

A flow finder module 95 may determine (see, for example, the operation 82 described above) a compilation flow for deployment of a model based, at least in part on the requirements 93. In an example embodiment, the compilation flow may be selected from a flow database 94. For example, the flow database 94 may store a plurality of possible compilation flows, and the flow finder 95 may select one of the plurality of possible compilation flows based on the requirements 93 to be the determined compilation flow for the model 91. The determined compilation flow may then be used for making one or more decisions at operations 92, 98, 100, and/or 102 described further below.

The algorithm 90 starts at operation 92, where it is determined whether quantization-aware training needs to be performed on the model 91. The determination may be dependent upon the determined compilation flow.

If it is determined that quantization aware training is to be performed, the quantization aware training is performed, for example, by performing retraining at operation 96. For example, the retraining at operation 96 may spawn a Docker container which takes the model 91 and the sample data 97 and re-trains the model 91 using a different weight bit depth (e.g. 8 bit).

The algorithm 90 moves to operation 98 if it is determined that quantization aware training should not be performed. At operation 98, it is determined whether post-training quantization needs to be performed. The determination may be dependent upon the determined compilation flow. If the post training quantization is to be performed, the post training quantization is performed, for example, by quantizing (e.g. at a weight scaling component) weights of the model at the operation 99 without requiring retraining of the model. The post-training quantization may therefore be performed locally without a Docker container. The weight scaling component may be capable of performing post-training quantization and precision scaling of the weights of the model 91.

The algorithm 90 moves to operation 100 after the operation 96, 99, or if it is determined (in the operation 98) that post-training quantization should not be performed. At operation 100, it is determined whether any format conversion actions should be performed. The determination may be dependent upon the determined compilation flow. If any format conversion actions are to be performed, the one or more format conversion actions are performed at operation 101. For example, some accelerators may require the model to be serialized or converted in a pre-defined format. To account for these scenarios, the one or more format conversion actions may be performed at a format converter component which may support a number of format conversion operations including, but not limited to TensorFlow-TensorFlow Lite, TensorFlow-OpenVINO, TensorFlow-TensorRT, and PyTorch-Tensorflow.

At operation 102, it is determined whether the compilation of the model 91 is an accelerator-specific compilation. The determination may be dependent on the determined compilation flow. If the compilation is accelerator specific (e.g. specific compilation based on the proprietary accelerator architecture), an accelerator specific compiler 103 may compile the model 91.

At operation 104, a compiled model binary is generated based on the compilation flow and one or more decisions made at operations 92, 98, 100, and/or 102.

In an example embodiment, since the compilation process depicted in algorithm 90 consists of several "basic" sub-operations (e.g., format conversion, quantization, re-training), a number of different compilation workflows (for existing and future accelerators) may be supported.

Figure 10:
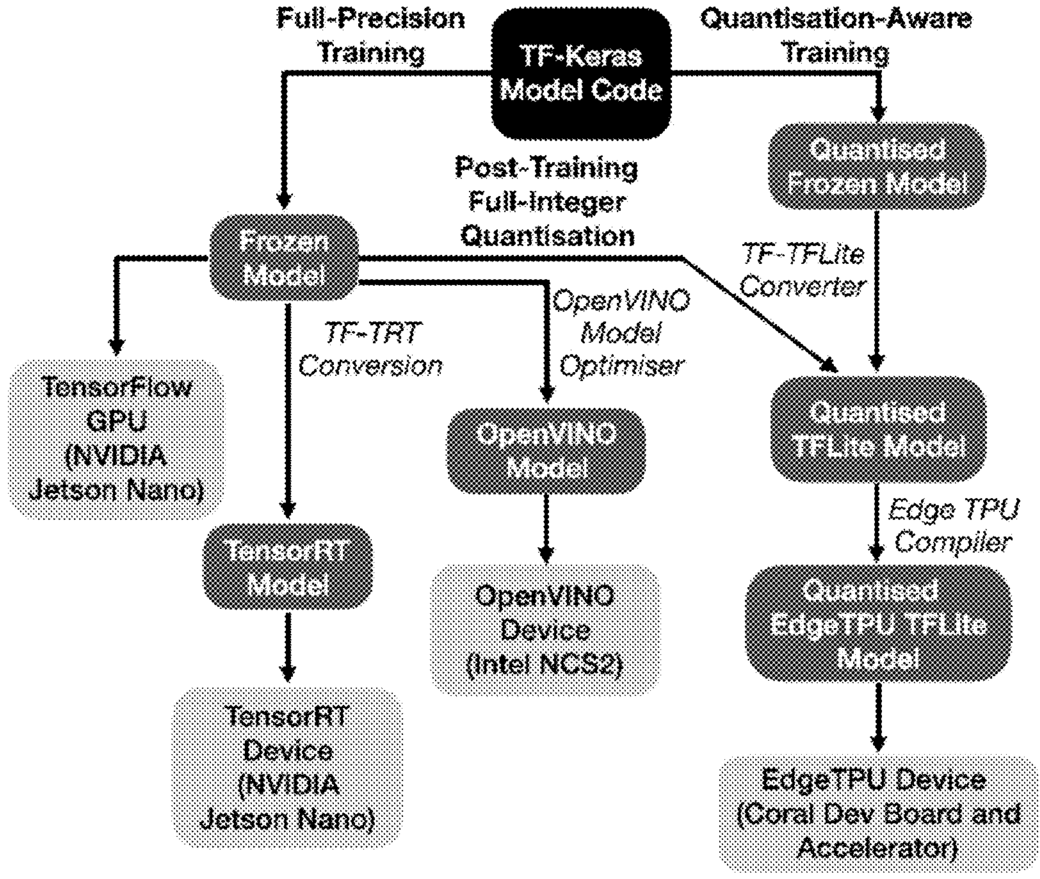
FIGS. 10 and 11 are block diagrams of systems in accordance with example embodiments.

FIG. 10 is a block diagram of a system, indicated generally by the reference numeral 105, in accordance with an example embodiment. The system 105 shows example compilation flows for existing accelerators which can be implemented by the compiler module (24 or 71) described above. (Note that the compilation flow can be easily extended if a new edge accelerator is released.)

System 105 shows aggregated compilation flows for three accelerators, Nvidia Jetson Nano, Intel NCS2 and Google Coral. System 105 considers deep learning models that have been implemented with native TensorFlow or with Keras with TensorFlow as an input.

In an example embodiment, with reference to the Jetson Nano accelerator, the first step is to train the algorithm by applying full-precision training which outputs a model with parameters expressed as 32-bit floating-point numbers. Then, the model needs to be frozen to convert all the inner variables to constant and make the model ready for the inference phase and further optimisation. The frozen model may natively run on the Jetson Nano using native TensorFlow with GPU support. Jetson Nano may also support TensorRT, a library that optimises the execution of neural networks by replacing the implementations of some layers with more efficient ones. TF-TRT converter may need information including input tensor name and shape, precision mode (FP16 or FP32), size of the inference batch, and size of the reserved execution memory. The output may be a TensorFlow-TensorRT frozen model ready to be deployed.

In an example embodiment, with reference to the Intel NCS2 accelerator, the Intel NCS2 accelerator may also need the full-precision frozen model to generate a model compatible with it. Then, the model is converted using the OpenVINO model optimiser, a cross-platform tool that runs static analysis and adjustments of the model. The optimiser may only need the shape of the input tensor and the floating number precision (e.g., FP16). The optimiser may return a set of files, known as Intermediate Representation (IR), that are used by the Inference Engine API to run the model over the Movidius Myriad X VPU.

In an example embodiment, with reference to the Google Coral accelerator, the Google Coral accelerator may use EdgeTPU. Since EdgeTPU does not support floating-point parameters, it may be required to represent the model weights as signed-integer numbers, i.e., quantisation. The EdgeTPU runtime supports quantisation-aware training which performs parameter quantisation at training time. The model is frozen after this step and then converted to TensorFlow Lite format. As an alternative, from the v12 of the EdgeTPU runtime, it supports posttraining full-integer quantisation. This procedure quantises all the parameters and activations without re-training the model. The procedure may require a small and representative dataset, which might be a part of the training set, to define the quantisation range. Note that, while quantisation-aware training requires the additional cost for re-training, higher accuracy may be achievable as it is generally more tolerant to lower precision values. The last step is to feed the quantised TensorFlow Lite model to the EdgeTPU compiler. The compiler verifies if the model meets the requirements. The compiler may statically define how weights are allocated in the Edge TPU on-chip memory and defines the execution of the TensorFlow Lite graph on the acceleration hardware.

In an example embodiment, the compiler modules 24 or 71 described above may identify the correct workflow to use in each of the above example accelerators and may automatically spawn and manage the appropriate components which perform the operations.

Figure 11:
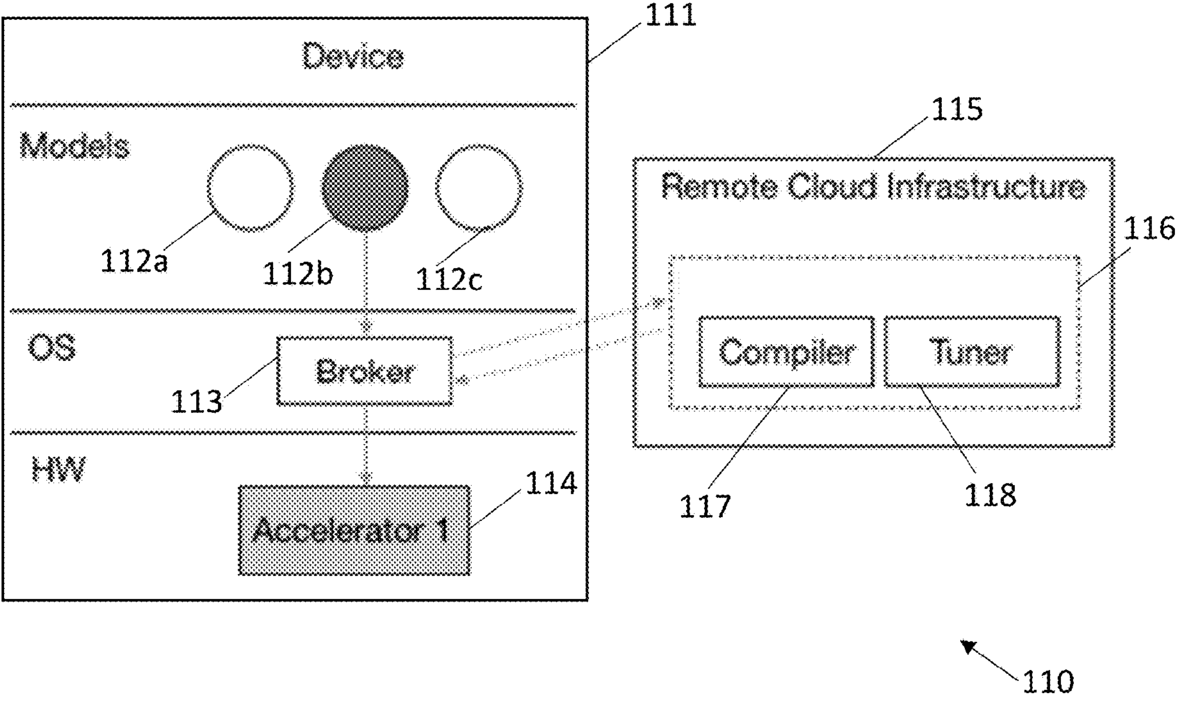

FIG. 11 is a block diagram of a system, indicated generally by the reference numeral 110, in accordance with an example embodiment. System 110 comprises a device 111 and a remote cloud infrastructure 115. The device 111 (which may be similar to the first device 21 described above) may comprise one or more models 112_a_, 112_b_, and 112_c_, such that one or more of the models 112 may be deployed at the accelerator module 114. The device 111 further comprises a broker 113 for communicating with the remote infrastructure 115. The remote cloud infrastructure 115 comprises a system 116, which comprises a compiler module 117 and a tuner module 118. This is in contrast with the system 20 shown in FIG. 2, where the compiler module 24 and the tuner module 25 were located in the device itself. The device 111 may communicate with the system 116 for using the compiler module 117 for converting and/or compiling the model 112 (e.g. the model 112*b* in the example shown) to execute it on the accelerator 114. The device 111 may also communicate with the system 116 for using the tuner module 118 for optimising the model 112*b*, for example to ensure optimal execution.

In an example embodiment, the broker 113 is located in the device 111 and is used for communicating with the remote infrastructure 115 and receiving a compiled model (e.g. from the compiler module 117) and/or an optimized model (e.g. from the tuner module 118), such that the received model may be ready to be deployed locally at the accelerator 114.

The system 110 may be useful, for example, where the hardware at the device 111 may not be powerful enough to support some operations (e.g. model re-training) which may negatively impact on the user experience in using the device. As such, when the compilation and tuning are performed remotely, the computational power that can be employed may be significantly higher (essentially unlimited) and the burden is reduced from users' devices. However, when the compilation or tuning is performed locally (e.g. as shown in FIG. 2), there may be benefits such as no network connectivity being required and user personal data could be used for the tuning operation without compromising the user's privacy. Further, performing the compilation and/or tuning remotely requires the device 111 to have network connectivity, which is not essential in performing these operations locally.

Figure 12:
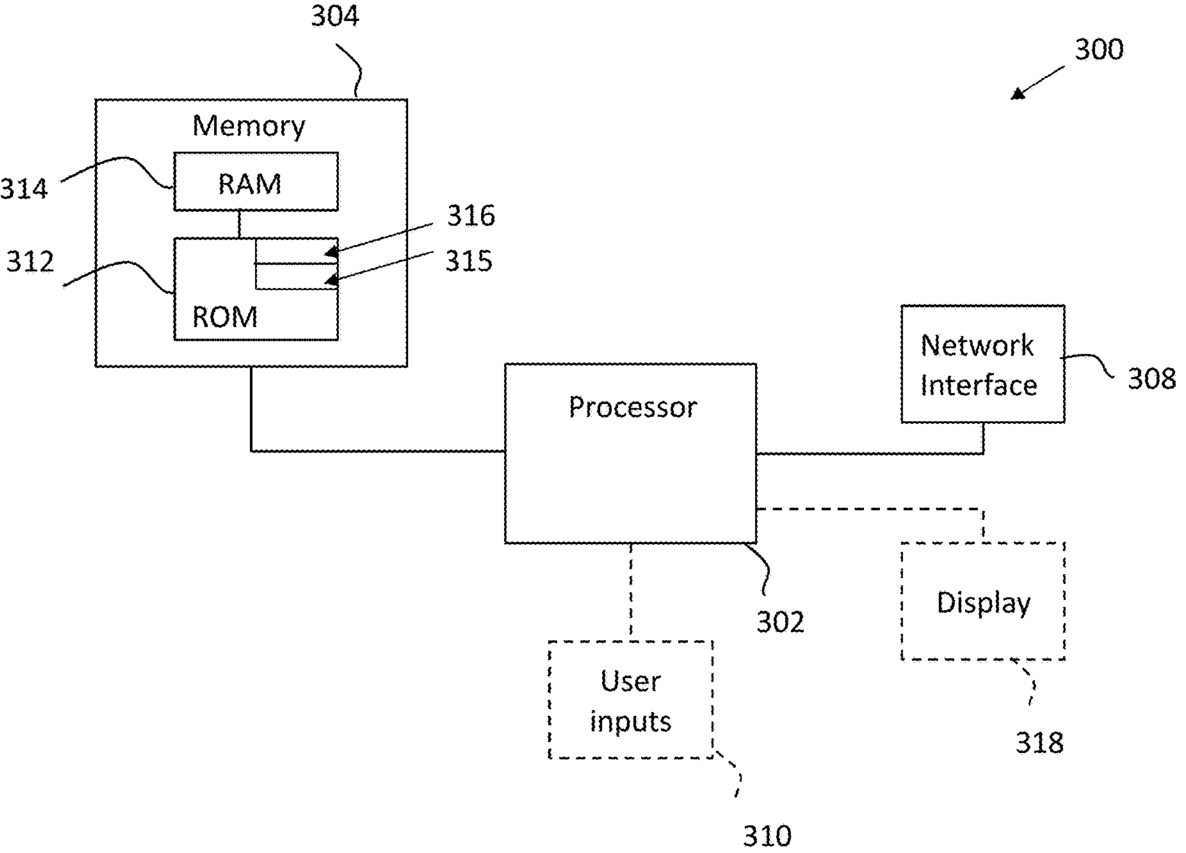
FIG. 12 is a block diagram of a system in accordance with an example embodiment.

For completeness, FIG. 12 is a schematic diagram of components of one or more of the example embodiments described previously, which hereafter are referred to generically as a processing system 300. The processing system 300 may, for example, be the apparatus referred to in the claims below.

The processing system 300 may have a processor 302, a memory 304 closely coupled to the processor and comprised of a RAM 314 and a ROM 312, and, optionally, a user input 310 and a display 318. The processing system 300 may comprise one or more network/apparatus interfaces 308 for connection to a network/apparatus, e.g. a modem which may be wired or wireless. The network/apparatus interface 308 may also operate as a connection to other apparatus such as device/apparatus which is not network side apparatus. Thus, direct connection between devices/apparatus without network participation is possible.

The processor 302 is connected to each of the other components in order to control operation thereof.

The memory 304 may comprise a non-volatile memory, such as a hard disk drive (HDD) or a solid state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain code which, when executed by the processor implements aspects of the algorithms 40, 50, 63, 80 and 90 described above. Note that in the case of small device/apparatus the memory can be most suitable for small size usage i.e. not always a hard disk drive (HDD) or a solid state drive (SSD) is used.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size.

In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figures 13A, 13B:
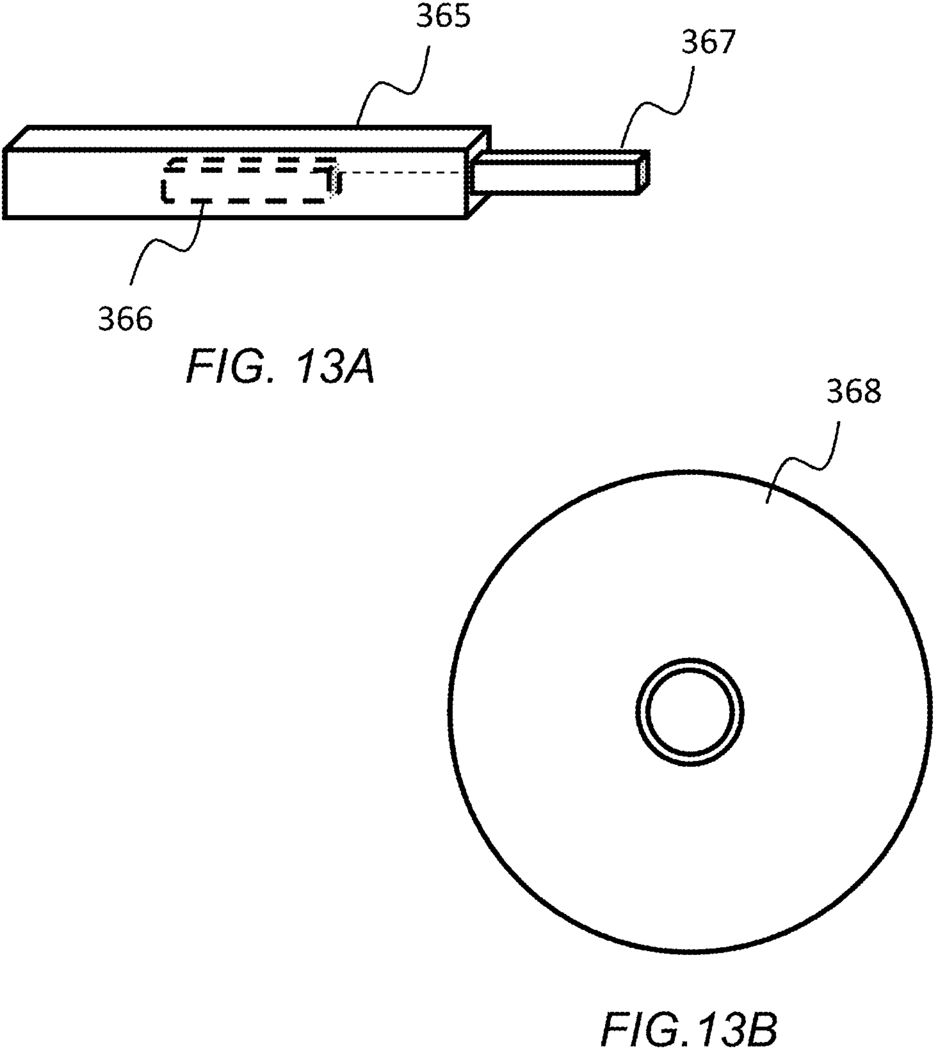
FIGS. 13A and 13B show tangible media, respectively a removable non-volatile memory unit and a compact disc (CD) storing computer-readable code which when run by a computer perform operations according to embodiments.

FIGS. 13A and 13B show tangible media, respectively a removable memory unit 365 and a compact disc (CD) 368, storing computer-readable code which when run by a computer may perform methods according to example embodiments described above. The removable memory unit 365 may be a memory stick, e.g. a USB memory stick, having internal memory 366 storing the computer-readable code. The internal memory 366 may be accessed by a computer system via a connector 367. The CD 368 may be a CD-ROM or a DVD or similar. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

If desired, the different functions discussed herein may be performed in a different order and/or concurrently with each other. Furthermore, if desired, one or more of the above-described functions may be optional or may be combined. Similarly, it will also be appreciated that the flow diagrams of FIGS. 4, 5, 6, 8 and 9 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus comprising:

at least one processor; and at least one memory comprising computer program code, the at least one memory and the computer program code configured to, with the at least one processor, cause the apparatus at least to perform:

determining an initial performance of a first model, wherein determining the initial performance comprises deploying the first model at a first device;

determining one or more operations for modifying the first model based on at least the initial performance of the first model and one or more user requirements, wherein the one or more operations comprise quantisation of the first model and/or causing concurrent execution of a plurality of models, including the first model, to improve use of memory at the first device;

modifying the first model by performing the one or more operations;

determining whether a performance of the modified first model satisfies the one or more user requirements, wherein the determining whether the performance of the modified first model satisfies one or more user requirements comprises deploying the modified first model at the first device; and in the event that the modified first model does not satisfy the one or more user requirements, further modifying the first model by performing one or more further operations until the performance of the modified first model satisfies the one or more user requirements, wherein the determining one or more operations further comprises determining one or more operations based on at least the performance of the modified first model and the one or more user requirements.

2. An apparatus as claimed in claim 1, wherein determining whether the performance of the modified first model satisfies the one or more user requirements further comprises:

running a first number of inferences of the deployed first model at the first device;

collecting performance values of the modified first model; and comparing the performance values with the one or more user requirements.

3. An apparatus as claimed in claim 1, wherein the one or more user requirements comprise one or more of accuracy requirements, latency requirements, memory consumption requirements, and/or energy consumption requirements.

4. An apparatus as claimed in claim 1, wherein the at least one memory and the computer program code are configured to, with the at least one processor, further cause the apparatus to perform:

retraining the modified first model.

5. An apparatus as claimed claim 1, wherein the one or more operations for modifying the first model comprises operations for optimising one or more of accuracy, latency, memory consumption, and/or energy consumption of the first model based on the one or more user requirements.

6. An apparatus as claimed in claim 1, wherein the one or more operations for modifying the first model further comprises one or more of:

modification of a size of the first model;

replacing one or more first actions comprised in the execution of the first model at the first device with one or more equivalent second actions, wherein the one or more first actions are unsupported by the first device, and the one or more second actions are supported by the first device.

7. An apparatus as claimed in claim 1, wherein deploying the modified first model at the first device further comprises:

receiving, from the first device, requirements of the first device, wherein the requirements are based at least in part on hardware of the first device;

determining a compilation flow for deployment of the modified first model in the first device based, at least in part, on the received requirements;

generating a compiled first model binary based, at least in part, on the compilation flow; and deploying the compiled first model binary at the first device.

8. An apparatus as claimed in claim 7, wherein generating the compiled first model binary further comprising performing, depending on the determined compilation flow, one of a pre-training quantization and post training quantization.

9. An apparatus as claimed in claim 7, wherein generating the compiled first model binary further comprises, depending on the determined compilation flow, performing one or more format conversion actions.

10. An apparatus as claimed in claim 7, wherein the compilation flow is determined based at least in part on an accelerator of the first device.

11. An apparatus as claimed in claim 1, wherein at least some of said means are remote from the first device.

12. A method comprising:

determining an initial performance of a first model, wherein determining the initial performance comprises deploying the first model at a first device;

determining one or more operations for modifying the first model based on at least the initial performance of the first model and one or more user requirements, wherein the one or more operations comprise quantisation of the first model and/or causing concurrent execution of a plurality of models, including the first model, to improve use of memory at the first device;

modifying the first model by performing the one or more operations;

determining whether a performance of the modified first model satisfies the one or more user requirements, wherein the determining whether the performance of the modified first model satisfies one or more user requirements comprises deploying the modified first model at the first device; and in the event that the modified first model does not satisfy the one or more user requirements, further modifying the first model by performing one or more further operations until the performance of the modified first model satisfies the one or more user requirements, wherein the determining one or more operations further comprises determining one or more operations based on at least the performance of the modified first model and the one or more user requirements.

13. A method as claimed in claim 12, wherein deploying the modified first model at the first device further comprises performing:

receiving, from the first device, requirements of the first device, wherein the requirements are based at least in part on hardware of the first device;

determining a compilation flow for deployment of the modified first model in the first device based, at least in part, on the received requirements;

generating a compiled first model binary based, at least in part, on the compilation flow;

and deploying the compiled first model binary at the first device.

14. A non-transitory computer-readable storage medium including a computer program comprising instructions for causing an apparatus to perform at least the following:

determining an initial performance of a first model, wherein determining the initial performance comprises deploying the first model at a first device;

determining one or more operations for modifying the first model based on at least the initial performance of the first model and one or more user requirements, wherein the one or more operations comprise quantisation of the first model and/or causing concurrent execution of a plurality of models, including the first model, to improve use of memory at the first device;

modifying the first model by performing the one or more operations;

determining whether a performance of the modified first model satisfies the one or more user requirements, wherein the determining whether the performance of the modified first model satisfies one or more user requirements comprises deploying the modified first model at the first device; and in the event that the modified first model does not satisfy the one or more user requirements, further modifying the first model by performing one or more further operations until the performance of the modified first model satisfies the one or more user requirements, wherein the determining one or more operations further comprises determining one or more operations based on at least the performance of the modified first model and the one or more user requirements.

* * * * *